March 8, 1966   C. H. WIKLUND   3,238,653
SLIDE CHANGER

Filed May 9, 1963   11 Sheets-Sheet 1

INVENTOR.
CARL H. WIKLUND
BY
ATTORNEY

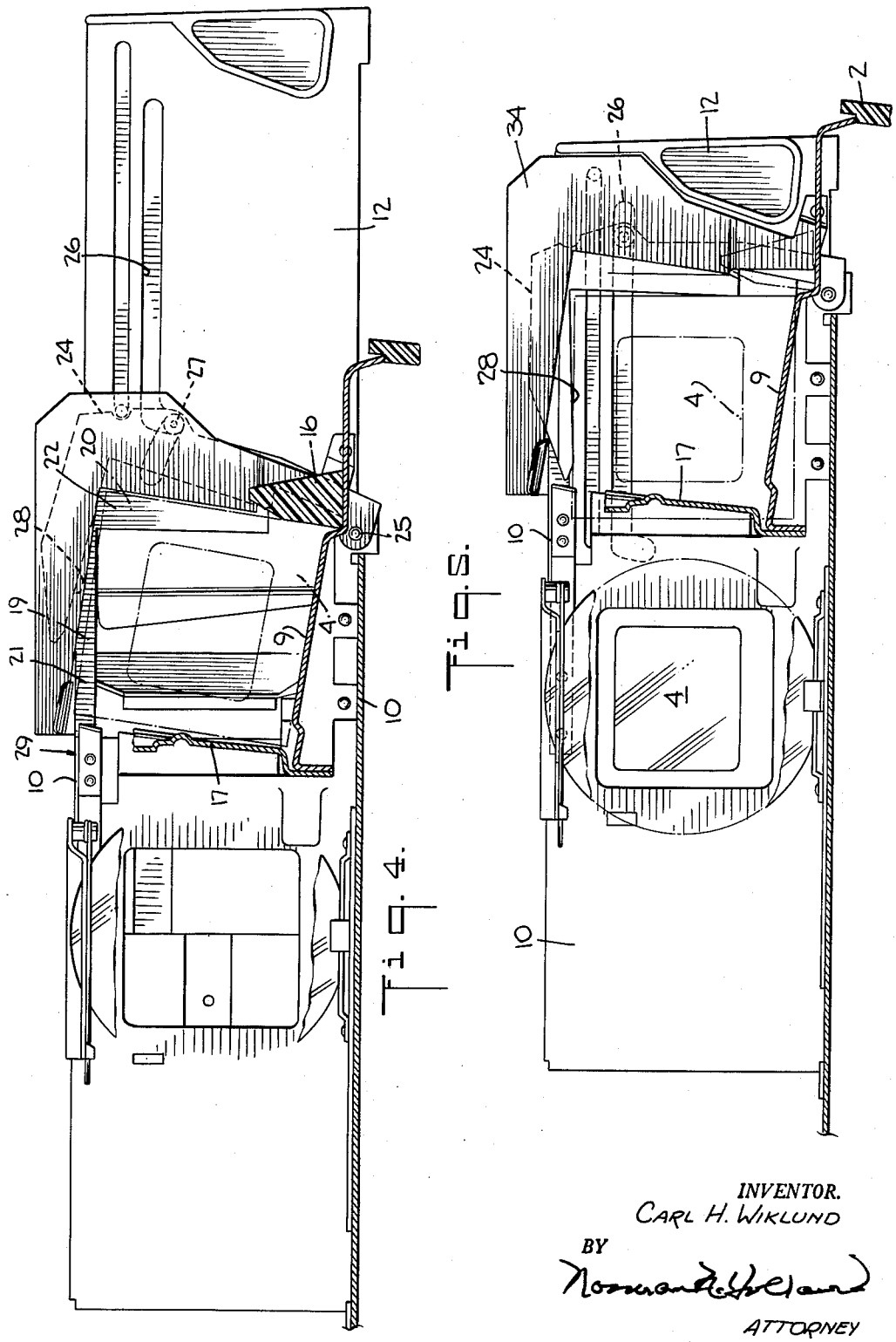

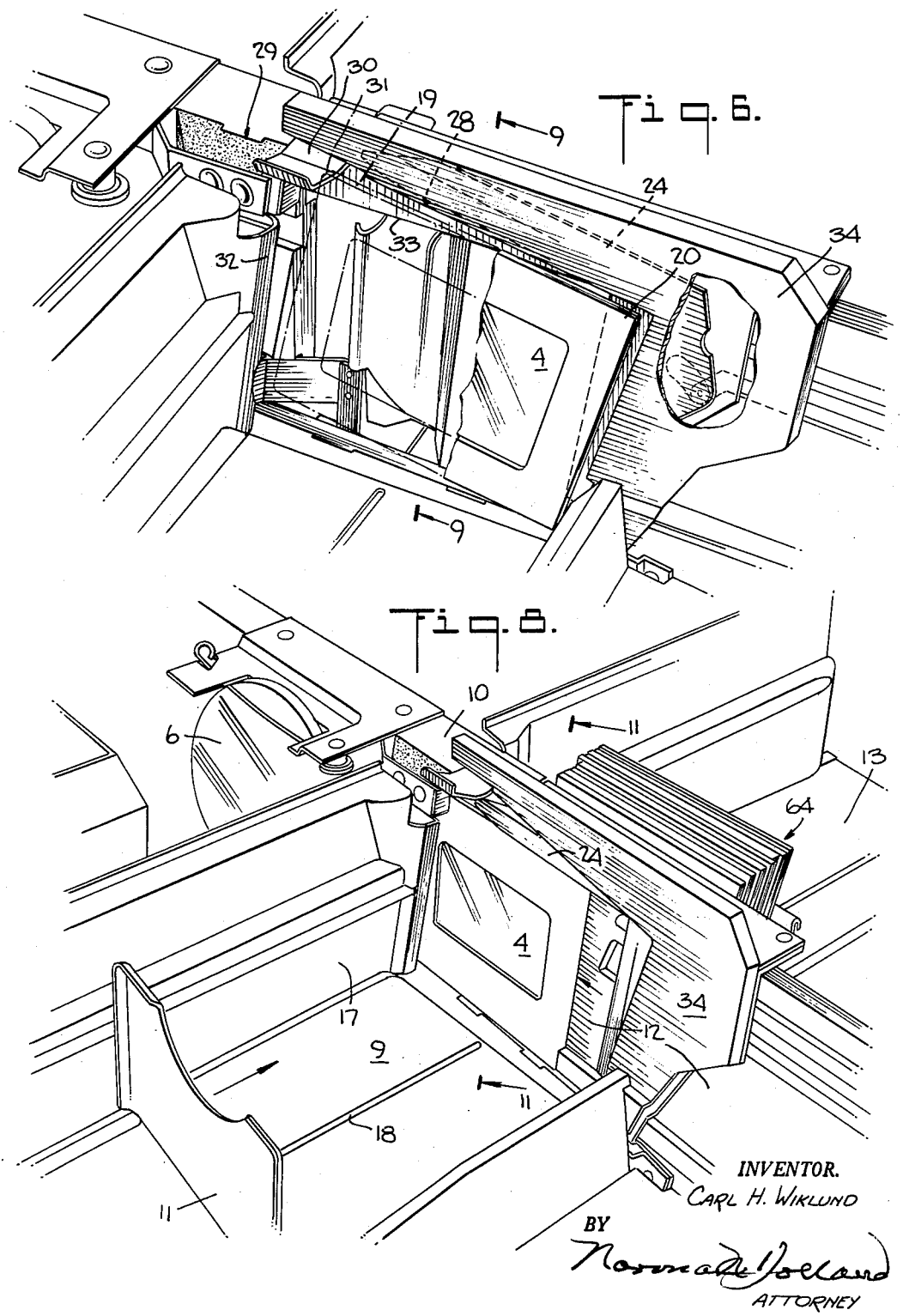

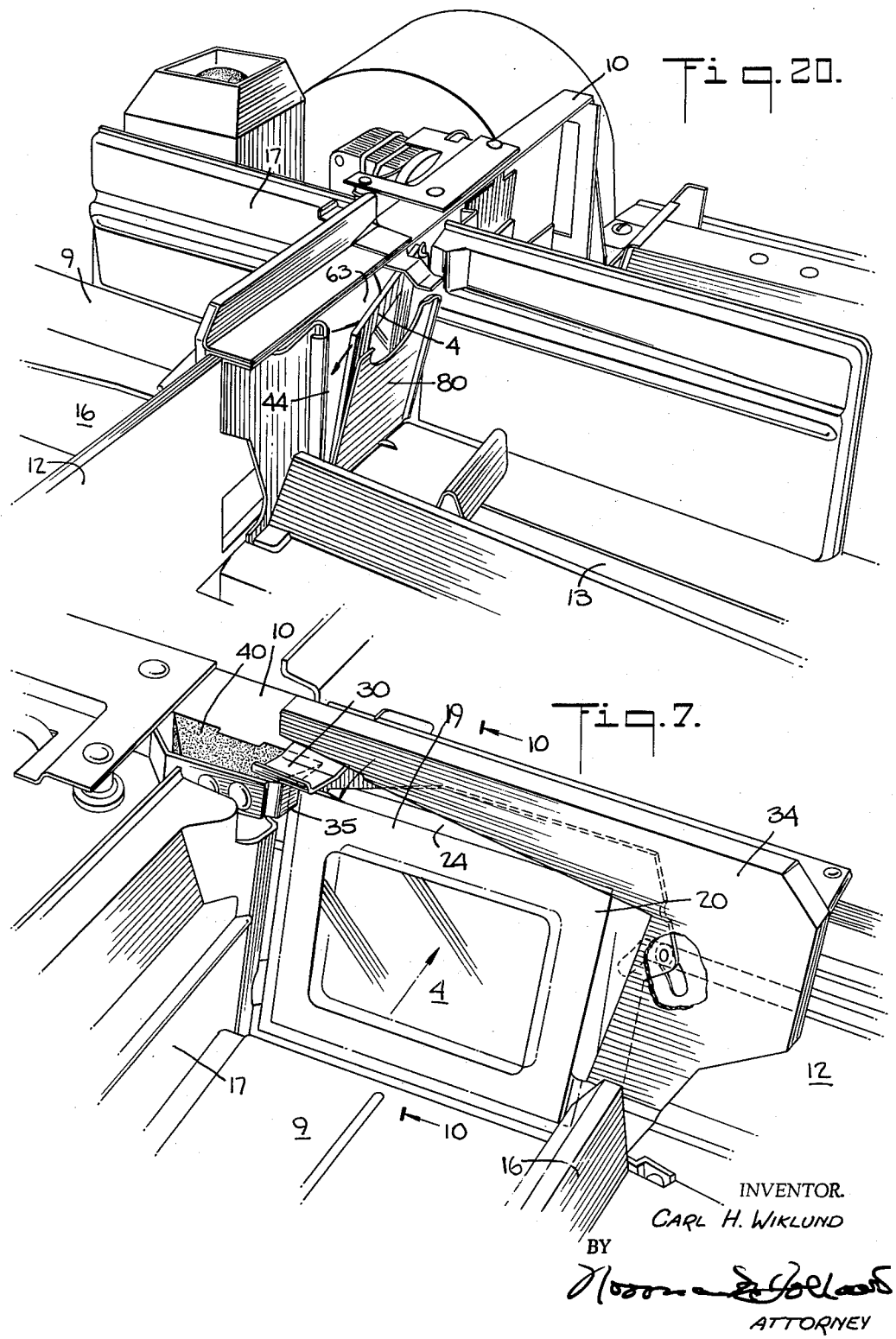

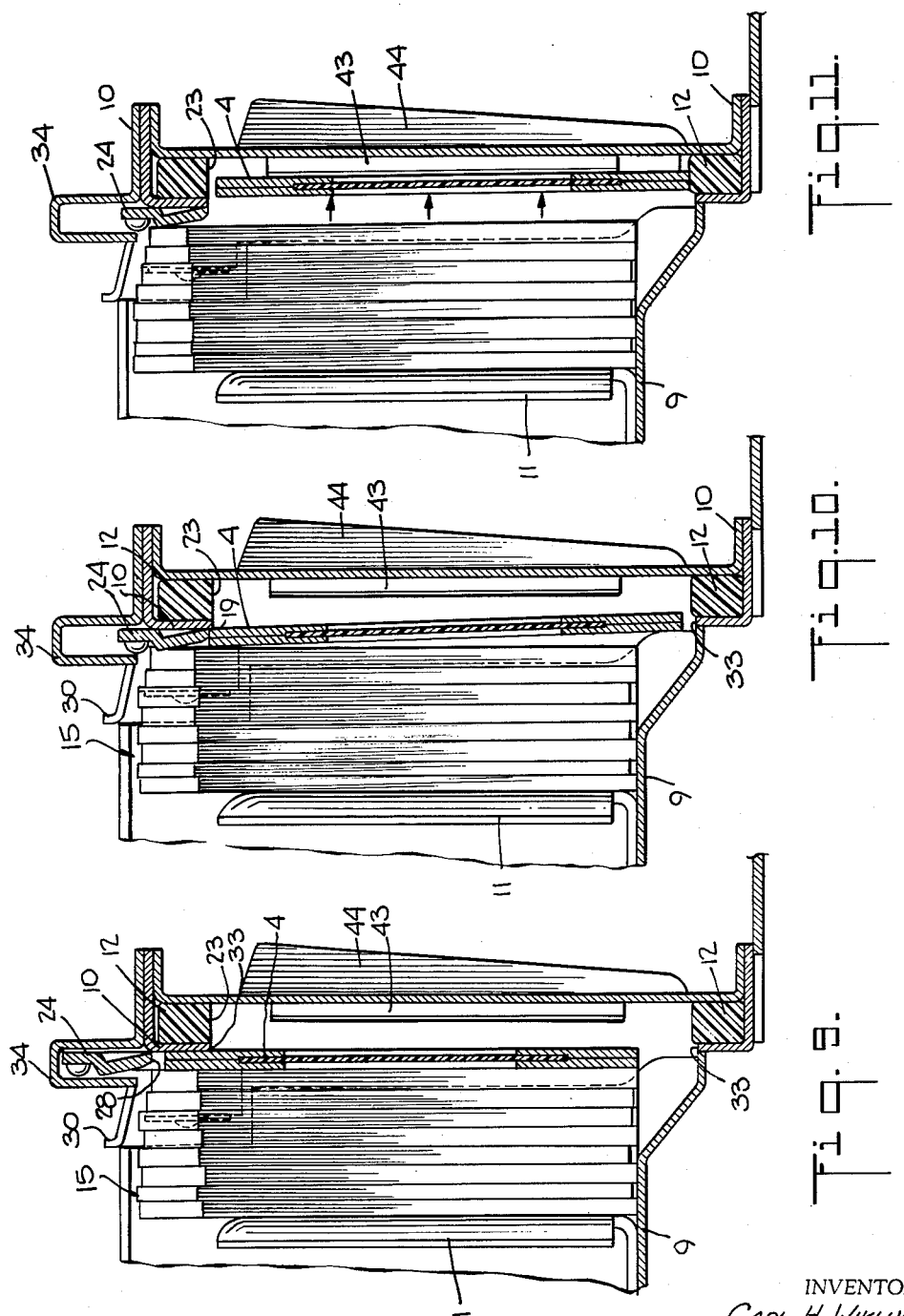

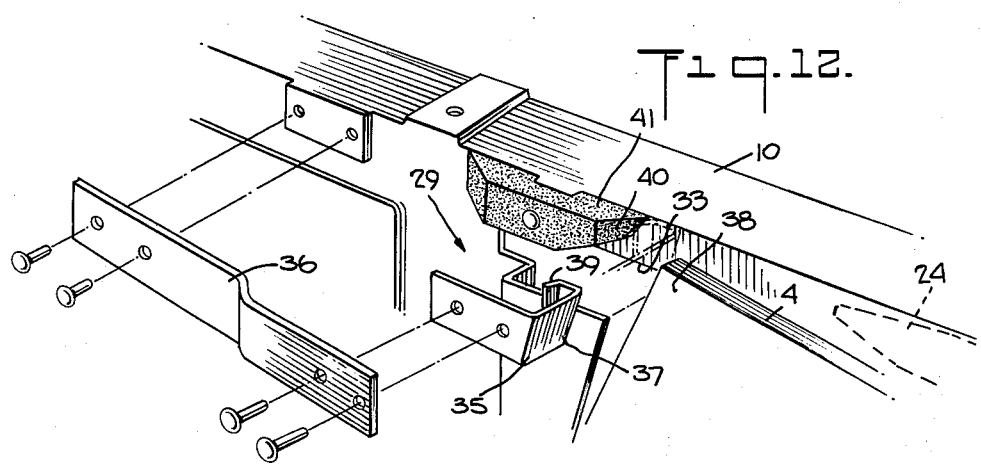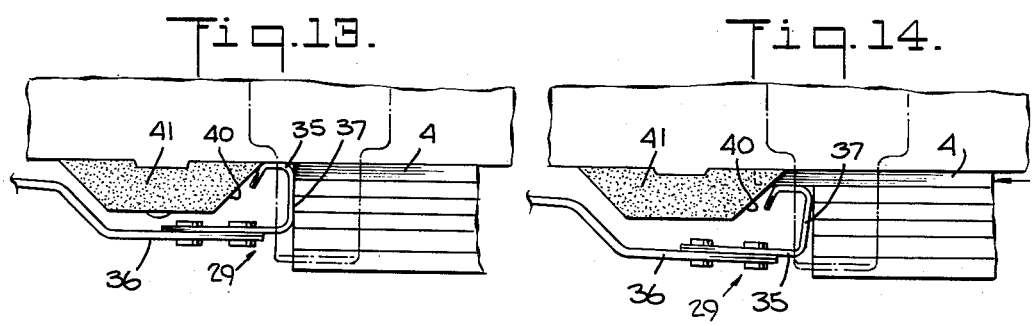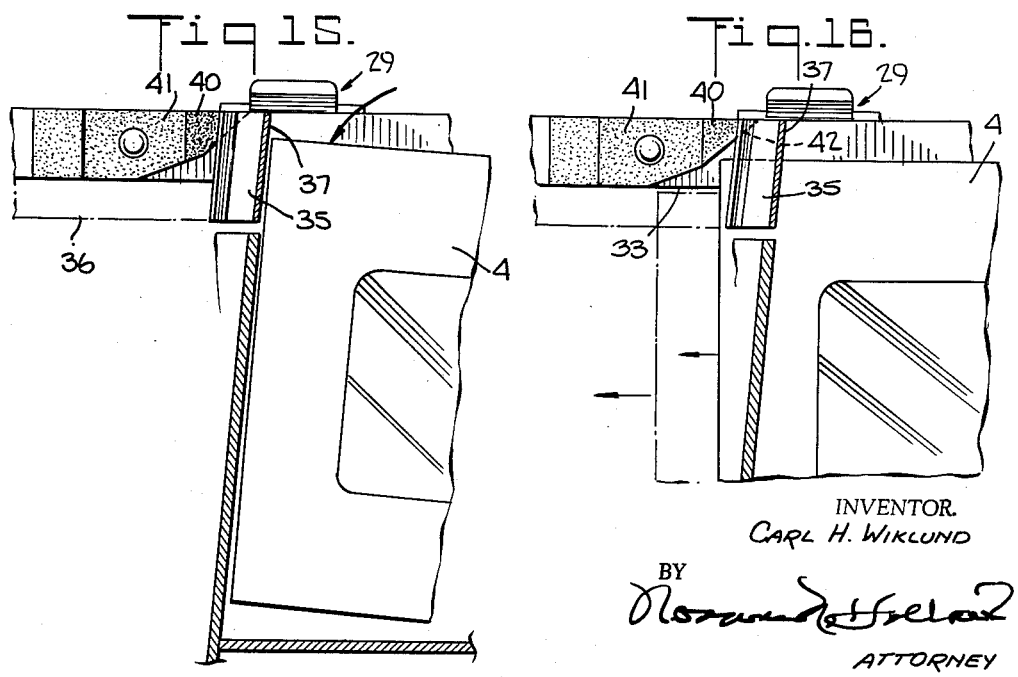

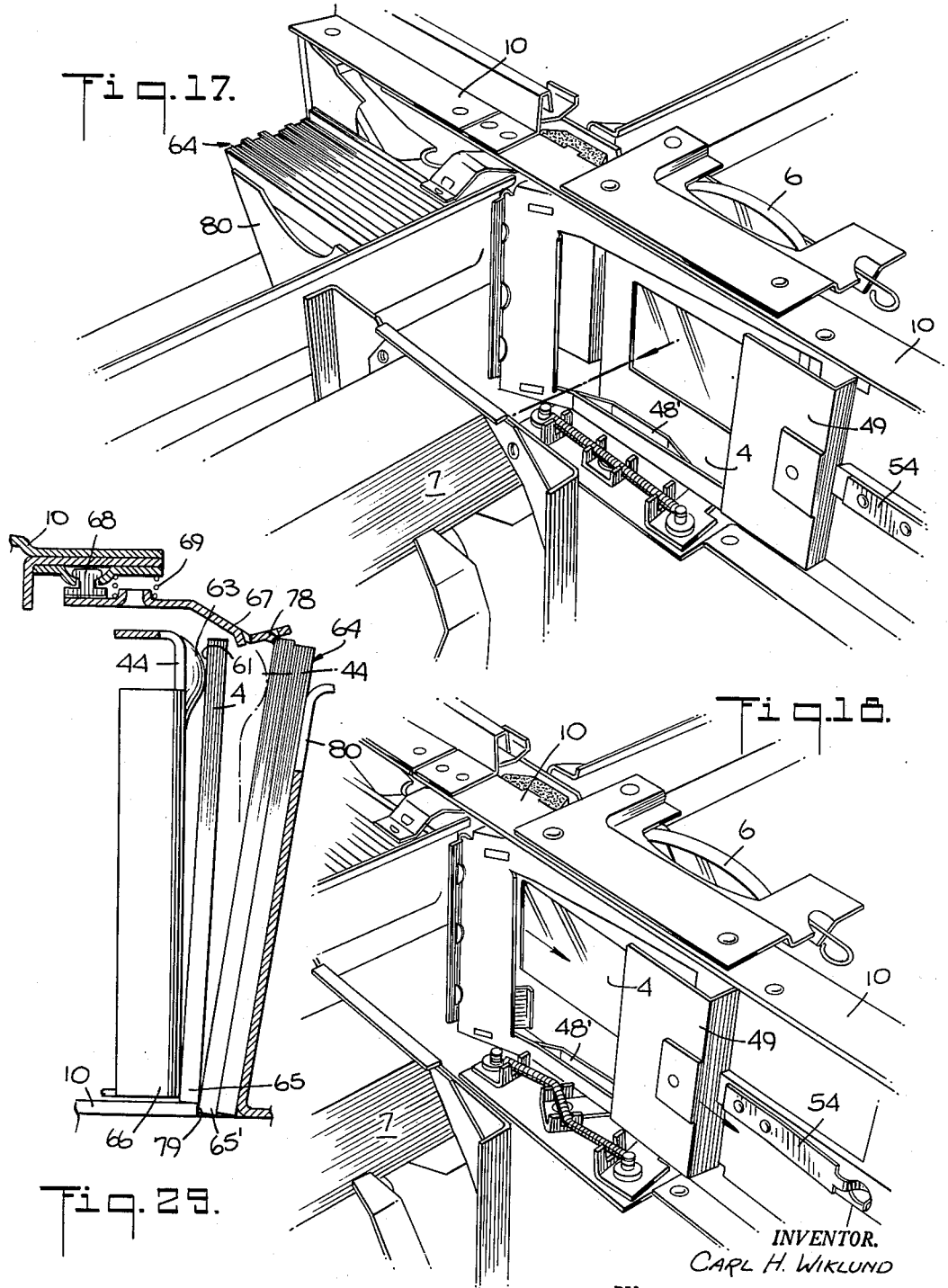

March 8, 1966     C. H. WIKLUND     3,238,653
SLIDE CHANGER
Filed May 9, 1963     11 Sheets-Sheet 8
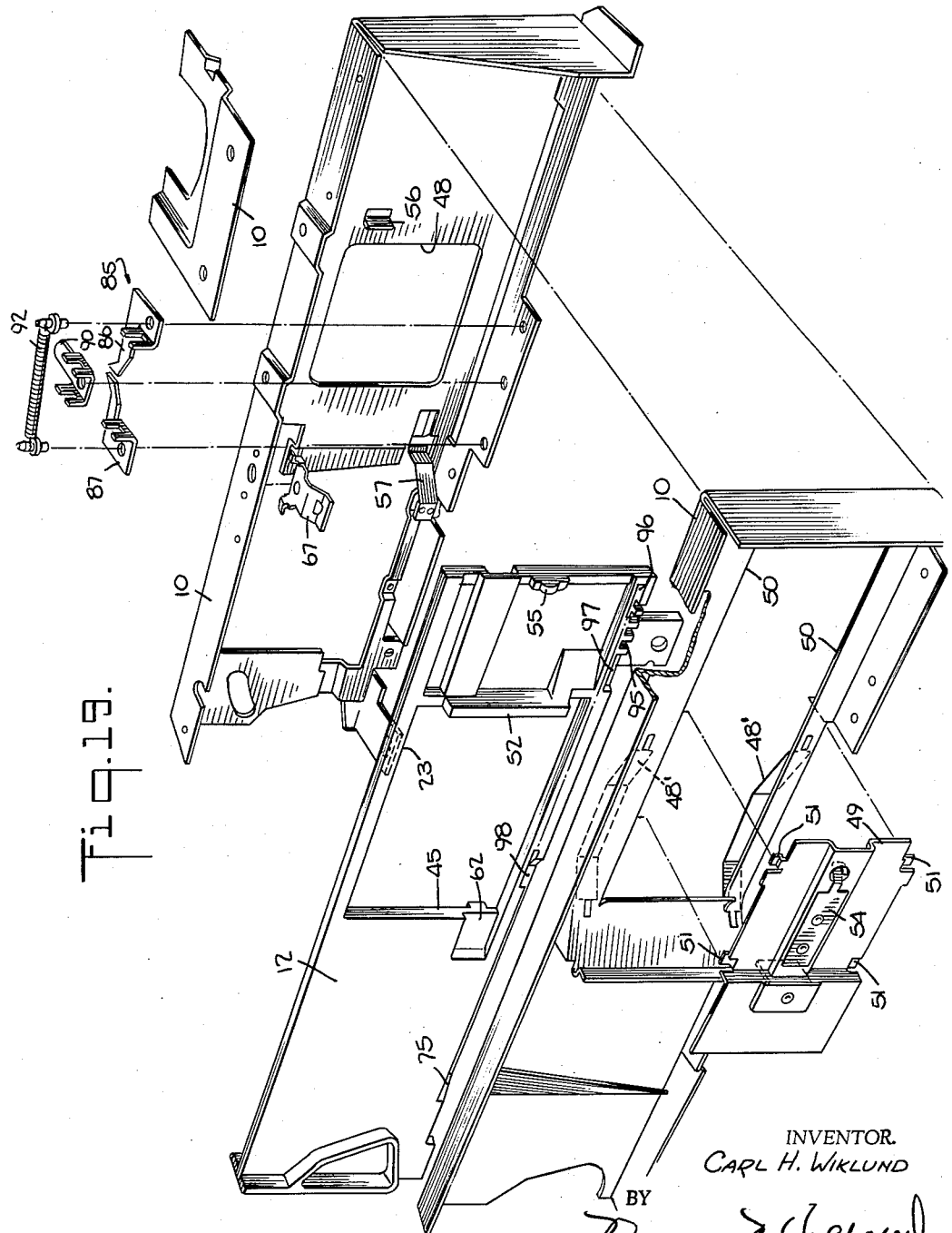
INVENTOR.
CARL H. WIKLUND
BY
ATTORNEY

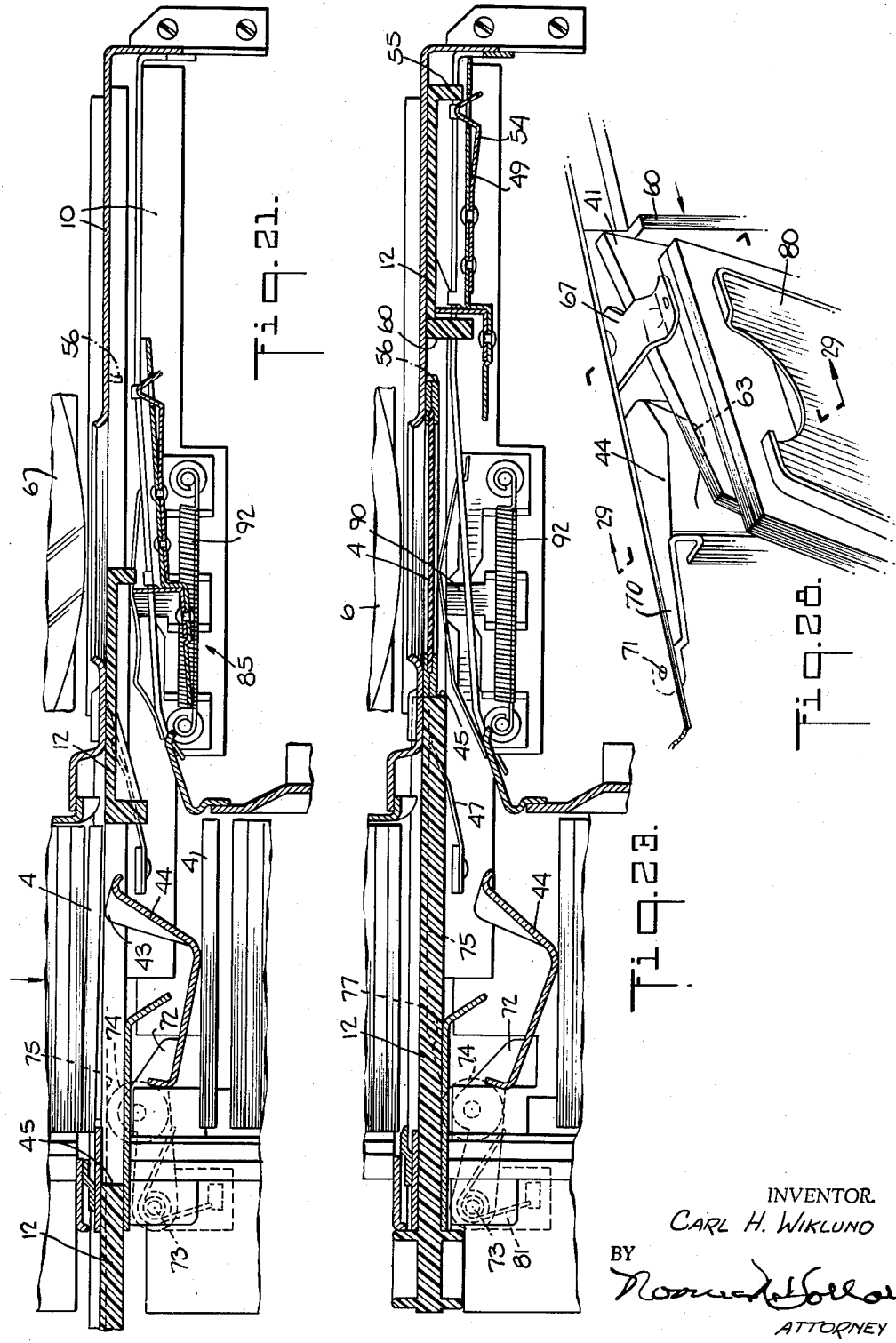

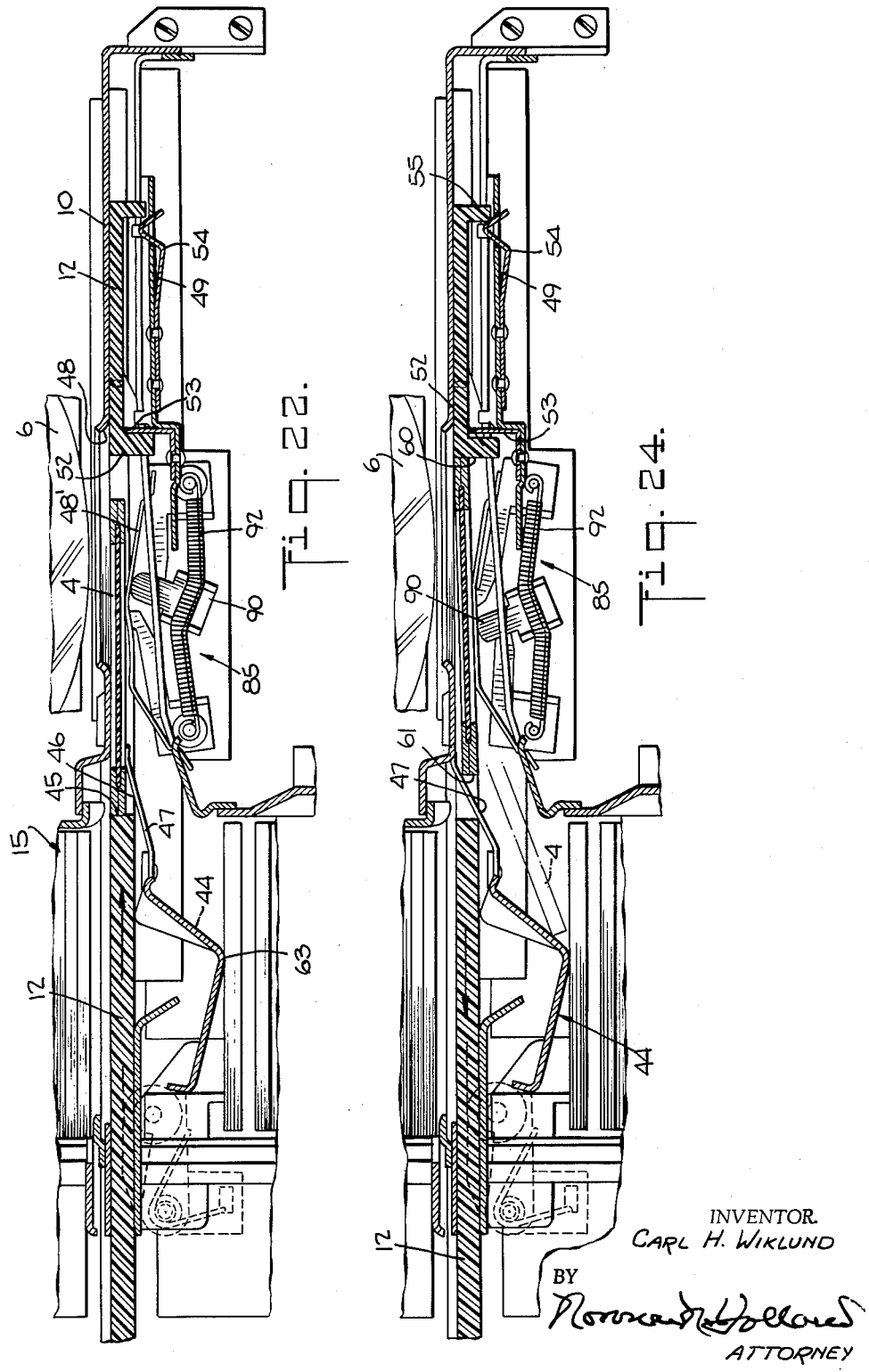

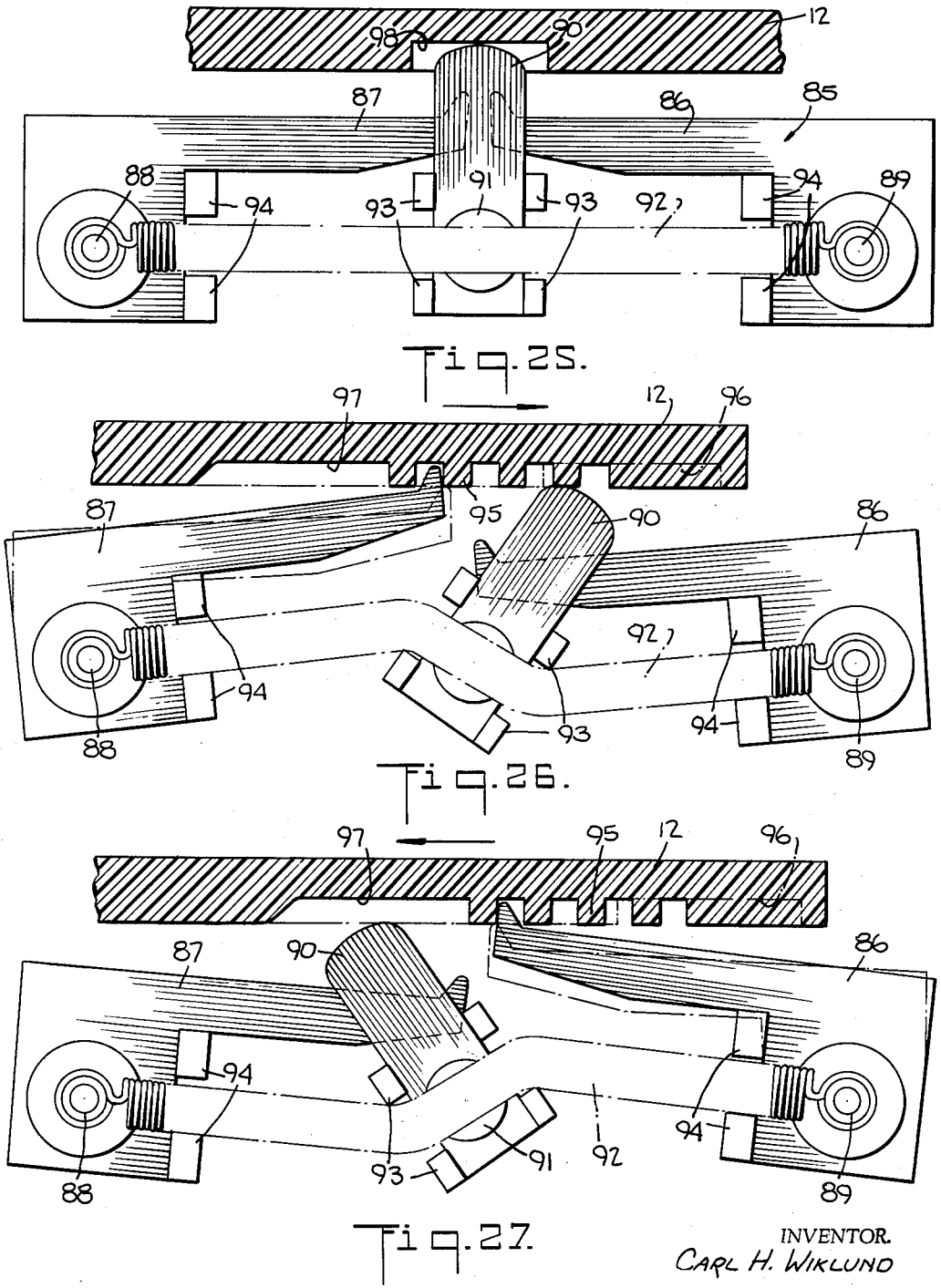

United States Patent Office 3,238,653
Patented Mar. 8, 1966

3,238,653
SLIDE CHANGER
Carl H. Wiklund, New Rochelle, N.Y., assignor, by mesne assignments, to Airequipt Inc., New Rochelle, N.Y., a corporation of New York
Filed May 9, 1963, Ser. No. 279,073
8 Claims. (Cl. 40—79)

The present invention relates to an improved slide changer for a slide projector and more particularly to such a slide changer adapted for use with slides having mounts or frames of varying types and thicknesses and capable of changing such slides with negligible wear so that slide mounts including paper mounts may be exhibited indefinitely.

The slide changer is of the general type which accepts a stack of slides on a suitable feed platform and which transfers the slides in sequence to a viewing position by the operation of a slide changing lever and where the slides are placed on the feed platform without the use of a magazine or other slide container.

The slide changer of the present invention improves upon known types of magazineless changers by providing a changing means which handles slides of varying thickness and which moves the slides including paper mounted slides to and from the viewing position with negligible wear and with minimal sliding contact between the slides and with the changing device itself. This improvement makes the changer useful with a variety of slide mounts and permits such mounts to be intermixed in a slide showing. It also permits a slide showing to be repeated indefinitely as the slides pass through the changing mechanism without significant wear such as is experienced in presently known changers of the magazineless type.

Accordingly an object of the present invention is to provide an improved magazineless type slide changer.

Another object of the present invention is to provide a magazineless slide changer adapted for use with slide mounts of varying types and thicknesses and to provide a slide changer which handles such slide mounts including paperboard mounts with minimum wear.

Another object of the present invention is to provide a slide changer with improved and simplified slide loading and slide changing steps.

Another object of the present invention is to provide a magazineless changer capable of handling a large number of slides with greater slide handling and slide changing efficiency.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 4 is a vertical sectional view of the slide feeding side of the changer frame taken along line 4—4 of FIG. 3 with the slide carrier in its outer position;

FIG. 5 is a vertical sectional view corresponding to FIG. 4 with the slide carrier in its inner position;

FIGS. 6 thru 8 are perspective views of the slide feeding portion of the changer illustrating the operation of the escapement lever and the slide selector gate in removing the endmost slide from the slide feed platform;

FIGS. 9 thru 11 are enlarged detailed sectional views of the frame and the escapement lever taken along lines 9—9, 10—10 and 11—11 of FIGS. 6, 7 and 8 respectively;

FIG. 12 is an enlarged detailed exploded perspective view of the slide selecting gate;

FIGS. 13 and 14 are enlarged detailed plan views of the gate of FIG. 12 in closed and open positions respectively;

FIGS. 15 and 16 are enlarged detailed elevational views partially in section corresponding to FIGS. 13 and 14 respectively;

FIGS. 17 and 18 are perspective views of the slide changer illustrating the slides in the slide viewing position;

FIG. 19 is an exploded perspective of the frame and slide carrier portions of the slide changer;

FIG. 20 is a perspective view of the slide receiving platform and the packer;

FIGS. 21 thru 24 are horizontal sectional views of the slide changer frame illustrating successive positions of a slide between the feed platform and the receiving platform;

FIGS. 25 thru 27 are enlarged detailed views of the ratchet means for controlling the slide carrier;

FIG. 28 is a fragmentary perspective view illustrating the detent member at the slide receiving platform; and FIG. 29 is a sectional view of the detent member taken along line 29—29 of FIG. 28.

Figure 1:
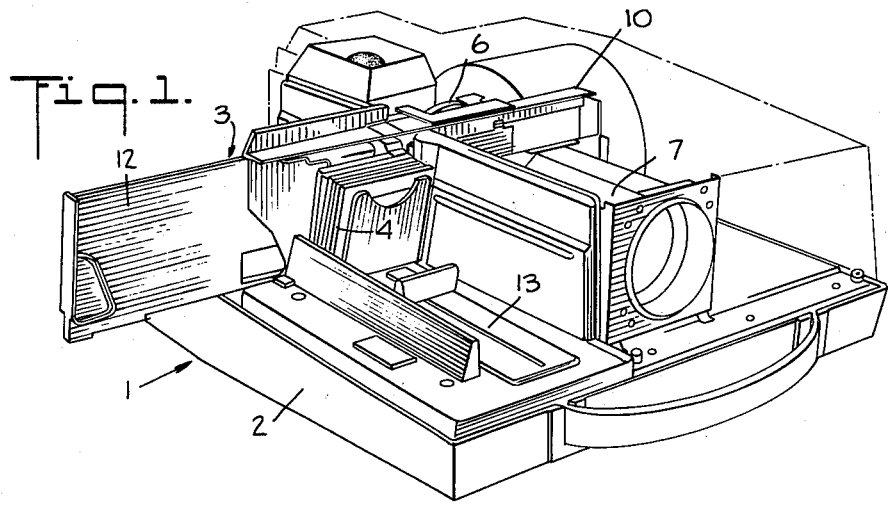
FIG. 1 is a perspective view showing the front portions of the improved slide changer of the present invention with the cover removed.
Figure 2:
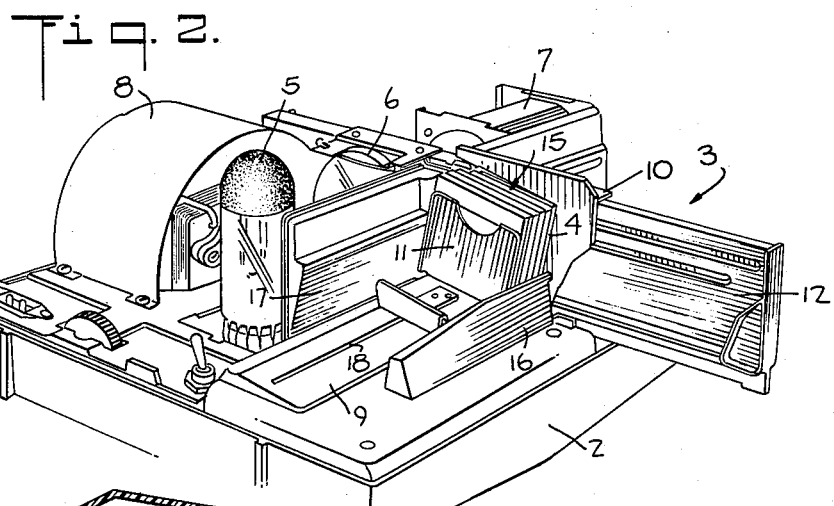
FIG. 2 is a perspective view illustrating the rear portions of the slide changer of FIG. 1.
Figure 3:
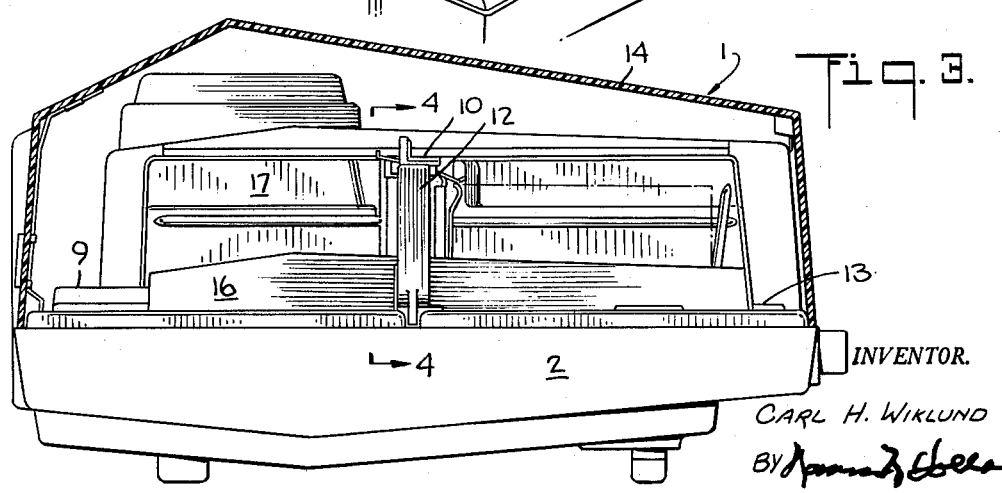
FIG. 3 is a side elevational view with the cover cut away.

FIGS. 1 thru 3 illustrate the slide changer in combination with conventional projection apparatus. This projector 1 comprises a suitable base 2 mounting the changer 3 which presents slides 4 in sequence at a viewing position in front of lamp 5 and between the condensing lens 6 and the objective lens 7.

A fan 8 is provided to create a flow of cooling air across the lamp 5 and the slide being projected.

The changer 1 has a slide feed platform 9 upon which a stack of the slides 4 is inserted between a slide changer frame 10 and a movably mounted pressure plate 11. A slide carrier 12 is reciprocally mounted in the frame 10 and when moved through a full cycle in and out of the frame 10, the slide carrier 12 carries one slide 4 from the feed platform 9 to the viewing position and simultaneously carries the previously viewed slide 4 from the viewing position to a receiving platform 13. A removable cover 14 is releasably connected to the base 2 to protect the projector when carried or stored.

*Slide feeding from the feed platform*

As illustrated in FIG. 2, the slide changer 3 is loaded with a stack 15 of the slides 4 which are inserted on the feed platform 9 between a feed rail 16 and a feed face plate 17. This stack of slides is urged towards the slide changer frame 10 by the pressure plate 11 movably mounted in a guide groove 18 on the feed platform 9 and urged towards the changer frame 10 by a suitable spring member (not shown).

A slide changing cycle is commenced by the removal of the endmost slide 4 adjacent the changer frame 10 and the movement of this slide 4 into the viewing position by the slide carrier 12. This selection of the endmost slide 4 will now be described in detail.

FIG. 6 illustrates the endmost slide 4 at the commencement of the changing cycle with the slide carrier 12 in its outermost position. As seen in FIGS. 2 and 4, the endmost slide 4 as well as the remaining slides 4 in the feed stack are positioned at an angle from the direction of travel of the slide carrier 12 so that the top and right side marginal portions 19 and 20 respectively of the endmost slide 4 abut surface portions 21 and 22 of the stationary slide changer frame 10. The stack of slides 4 is held in this inclined position by the correspondingly inclined attitude of the feed platform 9 and the feed face plate 17.

The endmost slide 4 is removed from the stack 15 and pushed into a pocket 23 (FIGS. 9 and 19) in the slide carrier 12 by an escapement lever 24 pivotally mounted at 25 on the changer frame 10 (FIG. 4). When the slide carrier 12 is in its outermost position, as seen in FIGS. 4 and 9, the escapement lever 24 has been rotated in a clockwise direction out of contact with the endmost slide 4 by means of the cam slot 26 on the slide carrier 12 and a cooperating cam roller 27 rotatably mounted on the escapement lever 24.

When the slide carrier 12 is moved inwardly toward its innermost position as illustrated in FIG. 5 the cam slot 26 in the slide carrier 12 swings the escapement lever 24 in a counter clockwise direction causing its feed surface 28 to engage the top of the innermost slide 4 to rotate the slide 4 permitting it to enter the slide carrier pocket 23 (FIGS. 10 and 11). This rotation and the selection of only the endmost slide 4 by the escapement lever 24 is facilitated by a gate device illustrated generally at 29 (FIGS. 4 and 6) and the operation of the escapement lever 24 and the gate 29 in selecting endmost slide 4 will now be described in detail with particular reference to FIGS. 6 thru 16.

FIGS. 6 and 9 illustrate the escapement lever 24 in its counter clockwise position (FIG. 9) with the slide carrier 12 in its outer position. In this position escapement lever 24 is within the hollow housing 34 on the frame 10. The endmost slide 4 is in its original tilted position with its marginal top and side areas engaging adjacent portions of the stationary slide changer frame. When the endmost slide 4 is in this position it is held outwardly of the slide carrier 12 and it in turn retains the remainder of the stack 15 in position between it and the pressure feed plate 11. A curved slide guide member 30 guides the uppermost corner 31 of the endmost slide 4 downwardly into the proper tilted position as the slides 4 advance towards the slide changer housing 10. At the same time, a suitably rounded guide surface 32 on the feed face plate 17 insures the proper positioning of the endmost slide 4 laterally of the feed platform 9.

Sectional FIG. 9 corresponds to the perspective FIG. 6 and the endmost slide 4 is clearly illustrated in engagement with the slide changer housing 10 and beneath the feed surface 28 of the escapement lever 24.

FIG. 7 and corresponding sectional FIG. 10 show the endmost slide 4 as it is rotated by the escapement lever so that its edge portions 19 and 20 are moved off of the frame 10 and are alined with the opening 33 in the slide changer frame 10 so that the pressure from the pressure plate 11 or the remaining stack 13 of slides will cause the endmost slide 4 to pop through the opening 33 into the slide changer housing and into the transfer pocket 23 of the slide carrier 12 in the position illustrated by perspective FIG. 8 and corresponding sectional view FIG. 11.

The above described selection operation of the escapement lever 24 in selecting the endmost slide 4 is supplemented by a cooperating selection action of the slide selecting gate 29 and the action of the gate in permitting only the endmost slide 4 to be rotated by the escapement lever 24 will now be described with particular reference to FIGS. 12 thru 16.

The gate device 29 comprises a gate spring 35 mounted on a spring arm 36 and having an individual slide abutment surface 37 in engagement with the last several slides of the feed stack 15 including the corner 38 of the endmost slide 4. A cam follower tip 39 on the gate spring 35 rests in sliding relationship with a sloping cam surface 40 on a gate cam 41. FIGS. 13 and 15 illustrate the endmost slide 4 in engagement with the gate spring 35 and with the gate spring 35 in its closed position preventing passage of the endmost slide 4 through the slide changer frame opening 33. As the escapement lever 24 rotates the slide 4 and forces its upper corner 38 against the gate spring 35, the gate spring 35 and its resilient mounting arm 36 cooperate to permit the cam follower tip 39 of the gate spring 35 to move outwardly of the stationary changer frame 10 along the camming surface 40 of the gate cam 41. This outward motion of spring 35 will continue as long as the corner 38 of the endmost slide 4 forces the gating spring 35 against the camming surface 40. When the gate spring 35 has opened or moved outwardly the width of the slide 4, the spring 35 will engage the face of the slide 4 as illustrated in FIGS. 14 and 16 and urge the slide 4 through the opening 33 in the frame 10 and into the pocket 23 in the slide carrier 12 (FIG. 16). The camming surface 42 is provided as a supplemental slide turning means, however, the slides normally are turned by escapement lever 24 and remain spaced from cam surface 42. As also illustrated in FIG. 14, however, the gating spring 35 will continue to abut the slide adjacent to the endmost slide 4 to hold this slide against rotation and to thereby provide a positive lock against the accidental entry of more than one slide into the slide carrier pocket 23. It is also clearly seen that an automatic gate has been provided whose width is determined by the width of the endmost slide and where the width of the gate corresponds exactly to the slide width no matter what the particular width of the endmost slide happens to be. As illustrated clearly in FIGS. 9 thru 11, the escapement lever 24 is narrower in width than the endmost slide 4 and this width of the escapement lever is set to be narrower than the thinnest available slide mounts to prevent the escapement lever from engaging more than the endmost slide.

As a result of the above described selector action the endmost slide 4 snaps or pops into the pocket 23 in the slide carrier 12. This pocket 23 loosely accommodates the slide 4 as both the width of the pocket 23 as determined by the width of the slide carrier 12 and the height and length of the pocket 23 are made larger than the corresponding dimensions of the largest slides to be exhibited. Thus, as illustrated in FIG. 11, the slide 4 rests loosely in the slide carrier pocket 23 between the upper and the lower edges of the slide carrier pocket 23 in its initial position between the next slide 4 in stack 15 and the inner surface 43 of a stacker member 44 (FIG. 11). As the slide carrier 12 is now moved inwardly of the housing, the edge 45 of the slide carrier pocket 23 advances the slide 4 towards the viewing position as the slide moves between the side walls of the frame 10 and past the inner surface 46 of a slide transfer spring 47 as illustrated in FIG. 22. As the slide 4 is moved into the viewing position, it is held in an aperture 48 in the frame 10 by a pair of leaf springs 48' as seen in FIGS. 17 and 19.

*Shutter*

In order to cut off the projector light beam during the slide transfer operation, a shutter 49 is slidably mounted in the frame 10 for movement by the slide carrier 12. As best illustrated in FIG. 19, shutter 49 is slidably mounted for reciprocal movement along the frame 10 on upper and lower guide rails 50 by means of four offset flanges 51. The shutter 49 is mounted with the rails 50 loosely accommodated between the shutter 49 and the flanges 51.

As a slide 4 is moved into the viewing position as illustrated in FIG. 22, a tab 52 on the slide carrier 12 strikes a cooperating flange 53 on the shutter 49 to move the shutter 49 lengthwise of the frame 10 and away from the viewing position. As the slide carrier 12 approaches its innermost position within the frame 10, the movement of the slide 4 is arrested by a stop 56 on the frame 10 and further movement of the slide carrier 12 carries the shutter 49 into its fully open position as illustrated in FIG. 23 leaving the slide 4 exposed for viewing.

When the slide carrier 12 is returned to its fully extended position to move the slide 4 out of the viewing position, the shutter 49 is returned to its light intercepting position through the engagement of a detent spring 54 with a tab 55 on the slide carrier 12 as illustrated in FIG. 24. The resilient detent spring 54 jumps over the tab 55 when the shutter has reached its fully closed position as illustrated in FIG. 21 and thus permits continued outward movement of the slide carrier 12 after the shutter is fully closed.

The relative position of the shutter 49 and the slide carrier 12 when the slide carrier 12 is fully inserted and when a slide 4 is in the viewing position is illustrated in FIG. 23. It is seen that in this position, the engagement of the shutter 49 with the frame 10 has caused the detent spring 54 to jump back over the tab 55 preparatory to the above described withdrawal of the slide carrier 12 and the aperture closing operation of the shutter 49.

After the projection interval the slide 4 is moved from the viewing position to the receiving platform 13 by the withdrawal of the slide carrier 12 from its inner position as illustrated in FIG. 23 to its outermost position as illustrated in FIG. 21. The slide 4 is carried outwardly by the abutment surface 60 of the slide carrier pocket 23 (FIG. 24). As the slide 4 is returned from the viewing position by the surface 60, its forward edge 61 engages the slide transfer leaf spring 47 which has sprung across the return path of the slide 4 to its normal position in the slide carrier pocket 23 having first moved into the cut out 62 in the slide carrier 12 as illustrated in FIG. 19. Continued outward movement of the slide carrier 12 moves the forward edge 61 of the slide 4 along spring 47 onto the receiving platform 13 and into engagement with the upper surface 63 of the curved packer 44. As illustrated in FIGS. 20 and 29, the top edge of the slide 4 engages the upper surface 63 of the packer 44 which tilts the slide slightly towards the inclined receiving pressure plate 80 but at a lesser angle than the pressure plate 80 and the slides already stacked thereagainst in stack 64. The lower edge 65 of the slide 4 at the same time is being moved in sliding line engagement between the lower edge 65' of the previously packed slide and the lower edge 66 of the stacker 44.

When the slide 4 has been fully moved onto the receiving platform in the position illustrated by the uppermost slide 4 in FIG. 21, the upper center portion of the slide remains in contact with the packer 44 and the slide is loosely positioned between the packer 44 and the resiliently mounted detent 67 as best illustrated in FIGS. 28 and 29. It is thus seen that the slide 4 moves onto the receiving platform 13 with minimal engagement against the preceding slide or the stacker 44 as its contact with the preceding slide is limited to the edge 65 of the slide.

The detent 67 is loosely coupled to frame 10 by a pin 68 which permits the detent to swing gently downwardly onto the top of the endmost slide in the stack 64 on the receiving platform under the force of the spring 69.

The detent 67 thereby holds the previously fed and stacked slide against the stack 64 or the pressure plate 80.

After each slide 4 has been withdrawn from the viewing position to the above described position in engagement with the packer 44 and on the receiving platform 13, it is next moved lengthwise of the receiving platform and into stacked position with the previously viewed slides in stack 64 by a swinging motion of the packer 44. In order to obtain this swinging motion, the packer 44 is operatively coupled to the slide carrier 12 so that the next inward movement of the slide carrier 12 to move a subsequent slide 4 into viewing position swings the packer 44 through its packing motion. The packer 44 is pivotally mounted on the slide changer frame 10 on an upper arm 70 (FIG. 28) pivotally connected to the top of the frame 10 at 71 and a similar arm 72 (FIG. 21) pivotally connected at 73 to the bottom of the frame 10. A cam roller 74 rotatably mounted on the lower arm 72 rides on a cam surface 75 on the slide carrier 12 as best illustrated in FIGS. 19 and 21 thru 24. When the packer 44 is in its slide receiving position as illustrated in FIG. 21, its inner surface 43 protrudes into the slide carrier pocket 23. The cam roller 74 rests on the most deeply grooved portion of the packer cam surface 75. As the slide carrier is moved inwardly to move a slide to the viewing position, the packer 44 is first swung outwardly by the engagement of its inner surface 43 with the surface of the slide carrier 12 and then is swung along the receiving platform 13 to its fully extended position by the movement of the cam roller 74 along the inclined surface 77 (FIG. 23) of the packer cam 75. As most clearly illustrated in FIGS. 23 and 29, this movement of the packer 44 swings the slide 4 from under the detent 67 and against the endmost slide of the stack 64 and causes the slide to be retained in this position between the stop 78 on the detent 67 and a lower retaining edge 79 on the surface of the receiving platform 13 conveniently formed by an edge of the slide changer frame 10 as illustrated in FIG. 29. This positioning of the endmost slide on the stack 64 by the upper detent 67 and the lower retaining edge 79 leaves a space for the entry of the next slide onto the receiving platform.

The slide feed and packing as described above prevents surface to surface sliding contact between slides as they are moved onto the receiving platform. During the initial portion of the next outward movement of the slide carrier 12 as it brings the next slide to the receiving platform, the packer 44 returns to its inner position under the force of spring 81 as the cam roller 74 returns to the most deeply grooved portion of the packer camming surface 75 on the slide carrier 12. As the slides 4 are moved into the stack 64 by the movement of the packer 44 the receiving pressure plate 80 moves along the receiving platform 13 against the force of a suitable spring preferably of the type providing a constant spring force regardless of the position of the pressure plate 80.

In order to provide for the proper operation of the above described slide changing action it is desirable for the slide carrier 12 to be moved continuously through a full cycle without reversing direction and this is particularly true during the initial portion of the inward stroke and during the terminal portion of the outer stroke for the following reasons. As described above, selection of the endmost slide from the feed pack includes a turning of the endmost slide by the rotation of the escapement lever 24. Should the slide carrier 12 be moved inwardly far enough to rotate the escapement lever a sufficient amount so that it pops a slide into the slide carrier pocket and if it is thereafter reversed and again pushed inwardly, it will be seen that two slides will be fed into the pocket thus spoiling the slide selection operation. In order to prevent this a ratchet means is provided. As will now be described, this ratchet means also prevents a reversal of slide carrier movement towards the terminal end of its motion since such an undesirable reversal at this time might result in an improper packing of the slides on the receiving platform as well as the failure of a slide to feed from the feed platform due to the failure of the operator to fully withdraw the slide carrier to its fully extended position.

The operation of a preferred embodiment of the ratchet means 85 will now be described with particular reference to FIGS. 21 thru 27. As seen in FIG. 25 the ratchet device comprises an actuator 90 pivotally mounted at 91 and having a pair of outstanding brackets 93 which contain a coil spring 92. Each of the opposite ends of the coil spring 92 pass through another bracket 94 formed on a pair of pawl members 86 and 87 pivotally mounted at 88 and 89. The above described spring 92 swings one or the other of the pawl members 86 and 87 into engagement with ratchet teeth 95 on the slide carrier for the ratchet action which will now be further described.

FIGS. 23 and 25 illustrate the changer with a slide 4 in the viewing position. The slide carrier 12 is in its fully injected position and the actuator 90 is in a neutral position within a lever switching notch 98 the slide carrier 12.

As the carrier is now moved outwardly to carry the slide 4 from the viewing position to the receiving stack, the actuator 90 is swung in a counterclockwise direction (FIGS. 24 and 27) causing the spring 92 to move pawl 86 against the carrier 12. The pawl 86 will now engage the teeth 95 at the end of the slide carrier 12 to prevent a slide carrier reversal in the terminal portion of the outward stroke of the slide carrier 12. When the slide carrier reaches its fully withdrawn position as illustrated in FIG. 21, the actuator 90 will enter notch 96 in the slide carrier 12 returning the ratchet means 85 to its neutral position.

When the next cycle is commenced by the inward movement of the slide carrier 12, the actuator 90 will be swung clockwise as seen in FIGS. 22 and 26 causing the pawl 87 to engage the slide carrier 12. The pawl 87 cooperates with ratchet teeth 95 on the slide carrier 12 to prevent a reversal of the slide carrier 12 during the initial portion of its inward stroke while the slide carrier 12 is rotating the escapement lever 24.

The slide carrier must be fully injected to its innermost position before the slide carrier 12 can again move the injection lever 24.

It will be seen that an improved magazineless changer has been provided which handles slides having varying widths and mounts without a magazine and which moves the slides through the changing cycle without subjecting them to wear by reducing the sliding contact between the slides themselves and between the slides and the changing apparatus to a minimum. In no case are the slides moved with more than a fraction of their surfaces in sliding contact with the changer surfaces or other slide surfaces. This method of handling the slides and particularly the elimination of sliding contact in the center portion of the slides eliminates accidental interlocking of the slides even where the slides are warped or bent.

These improvements permit a slide showing to be had of a group of slides having differing amounts of different thicknesses and also permits slides including those having paperboard mounts to be shown over and over an indefinite number of times without damage or wear.

The positive and controlled selection of slides from the feed stack and the improved packing action on the receiving stack prevent accidental damage to even the least rigid slide mounts. Accidental jamming of the changer is eliminated by the controlled slide selection including the slide selecting gate action, the improved ratchet action, and the cooperating stacking action at the slide receiving stack.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A slide changer for moving rectangular slides from a feed position to a viewing position comprising the combination of movably mounted slide carrier, a support means for said carrier having a slide passing aperture therein, a slide carrying pocket in said slide carrier, means to support a stack of slides adjacent said slide carrier with the edges of the slides angularly disposed to the direction of the carrier motion and with an endmost slide engaging said support means and being spaced from said slide carrier, means for urging said stack towards said support means, a gate engaging the edge of said endmost slide, a cam for swinging said gate away from the edge of said endmost slide responsive to the movement of the endmost slide against said gate and providing an opening equal to the width of the endmost slide, and means for turning said endmost slide in its own plane and out of engagement with said support means whereby said pressure means moves the endmost slide through said gate and said aperture into the slide carrying pocket and causes the next to the endmost slide to move to a position against said support means and spaced from said slide carrier.

2. A slide changer for moving slides from a feed position to a viewing position comprising the combination of movably mounted slide carrier, a support means for said carrier having a slide passing aperture therein, a slide carrying pocket in said slide carrier, means to support a stack of slides of varying thicknesses adjacent said slide carrier with an endmost slide engaging said support means and being spaced from said slide carrier, means for urging said stack towards said support means, a spring engaging the front edges of the two endmost slides in said stack, cam means for causing movement of said spring out of the plane of the endmost slide pursuant to movement of the edge of said endmost slide thereagainst a distance equal only to the thickness of the endmost slide whereby said spring remains in the plane of the next to the endmost slide, and a movably mounted member operatively coupled to said carrier for moving said endmost slide out of engagement with said support means and past said member and through said aperture into the slide carrying pocket and causing the next to the endmost slide to move to a position engaging said support means and spaced from said slide carrier.

3. In a slide changer as claimed in claim 1 a carrier controlling ratchet comprising the combination of a first pivotally mounted pawl, a second pivotally mounted pawl, spring means engaging said pawls, a sensing member pivotally mounted adjacent said carrier for sliding engagement therewith and at an angle thereto determined by the direction of the carrier movement, sensing member reversing means on said carrier, ratchet teeth on said carrier, and said sensing means being coupled to said spring means whereby one or the other of said pawls is urged against said carrier in accordance with the angular position of said sensing means for engagement with said ratchet teeth.

4. In a slide changer as claimed in claim 1 a carrier controlling ratchet comprising the combination of a first pivotally mounted pawl, a second pivotally mounted pawl, a sensing member pivotally mounted adjacent said carrier for sliding engagement therewith and at an angle thereto determined by the direction of the carrier movement, ratchet teeth on said carrier, sensing member reversing means on said carrier and an elongated resilient member coupling said pawls and said sensing member whereby one or the other of said pawls engages said carrier in accordance with the angular position of said sensing member for engagement with the ratchet teeth on said carrier.

5. In a slide changer as claimed in claim 2 a carrier controlling ratchet comprising the combination of a first pivotally mounted pawl, a second pivotally mounted pawl, spring means engaging said pawls, a sensing member pivotally mounted adjacent said carrier for sliding engagement therewith and at an angle thereto determined by the direction of the carrier movement, sensing member reversing means on said carrier, ratchet teeth on said carrier, and said sensing means being coupled to said spring means whereby one or the other of said pawls is urged against said carrier in accordance with the angular position of said sensing means for engagement with said ratchet teeth.

6. In a slide changer as claimed in claim 2 a carrier controlling ratchet comprising the combination of a first pivotally mounted pawl, a second pivotally mounted pawl, a sensing member pivotally mounted adjacent said carrier for sliding engagement therewith and at an angle thereto determined by the direction of the carrier movement, ratchet teeth on said carrier, sensing member reversing means on said carrier and an elongated resilient member coupling said pawls and said sensing member whereby one or the other of said pawls engages said carrier in accordance with the angular position of said sensing means for engagement with the ratchet teeth on said carrier.

7. In a slide changer for a projector having an optical axis having means for forming a stack of slides on a slide receiving platform from a succession of slides moved in sequence along a first path between said axis and said platform onto said platform by a movably mounted slide carrier and having a pressure plate movably mounted on said platform for movement along a second path generally perpendicular to said first path for positioning a stack of slides on said platform the improvement which comprises a slide packer movably mounted for movement along said second path towards said pressure plate for pushing slides along said platform towards said pressure plate, means operatively connecting said packer with said slide carrier for moving said packer toward said pressure plate along said second path during movement of said slide carrier along said first path, and a resilient slide engaging detent positioned for engaging and holding the top of the endmost slide after it is pushed against said stack of slides by said packer.

8. The changer as claimed in claim 7 in which said packer is pivotally mounted for swinging movement towards said pressure plate and said connection between said slide carrier and said packer comprises a cam and a cooperating cam follower causing said carrier to swing said packer.

References Cited by the Examiner
UNITED STATES PATENTS

| | | | |
|---|---|---|---|
| 2,533,441 | 12/1950 | Estes | 88—28 |
| 2,583,442 | 1/1952 | Parlini et al. | 40—79 |
| 2,814,965 | 10/1956 | Lacoe | 40—78 X |
| 2,864,190 | 12/1958 | Horton | 88—28 X |
| 3,077,817 | 2/1963 | Ehemann | 40—79 X |

EUGENE R. CAPOZIO, *Primary Examiner.*

JEROME SCHNALL, *Examiner.*